United States Patent [19]
Tanabe et al.

[11] Patent Number: 5,184,803
[45] Date of Patent: Feb. 9, 1993

[54] FLUID DAMPED ELASTOMERIC BUSHING

[75] Inventors: Mamoru Tanabe, Okayama; Motoyuki Yokota, Okayama; Sohei Fujiki; Masaru Sui, both of Kurashiki, all of Japan

[73] Assignee: Marugo Rubber Industries, Ltd., Kurashiki, Japan

[21] Appl. No.: 700,463

[22] Filed: May 15, 1991

[30] Foreign Application Priority Data

May 22, 1990 [JP] Japan .................. 2-133578

[51] Int. Cl.$^5$ .................. F16F 3/08; B60G 13/00
[52] U.S. Cl. .................. 267/140.12; 267/219
[58] Field of Search .......... 180/300, 312, 902; 248/562, 636; 267/140.1, 219, 140.1 C

[56] References Cited

U.S. PATENT DOCUMENTS

| 4,861,004 | 8/1989 | Yokota et al. | 267/140.1 |
| 4,884,789 | 12/1989 | Takeda et al. | 267/140.1 |
| 4,895,353 | 1/1990 | Roth et al. | 267/140.1 |
| 4,921,229 | 5/1990 | Hori | 267/140.1 |
| 4,941,649 | 7/1990 | Funahashi et al. | 267/219 |

FOREIGN PATENT DOCUMENTS

| 62-224746 | 10/1987 | Japan . | |
| 0126452 | 5/1989 | Japan | 267/140.1 |
| 1-164831 | 6/1989 | Japan . | |
| 2-26337 | 1/1990 | Japan . | |

Primary Examiner—Robert J. Oberleitner
Assistant Examiner—Chris Schwartz
Attorney, Agent, or Firm—Wenderoth, Lind & Ponack

[57] ABSTRACT

A fluid-damped elastomeric bushing has an inner sleeve and an outer sleeve disposed outwardly of the inner sleeve, and two sidewalls extending between the inner sleeve and the outer sleeve and a partition wall to thereby form a pair of fluid compartments. The fluid compartments has a main chamber and a supplemental chamber in communication with the main chamber. An elastic support member extends radially outwardly from the inner sleeve toward the outer sleeve between the side walls to form a first main chamber and a second main chamber.

An orifice device is disposed circumferentially along the outer sleeve for communicating the first and second main chambers for causing a fluid in one of the first and second main chambers to be forcibly fed to the other one of the first and second main chambers when a load is applied to the bushing.

5 Claims, 7 Drawing Sheets

FLUID DAMPED ELASTOMERIC BUSHING

BACKGROUND OF THE INVENTION

The present invention relates to a vibration prevention support structure used to minimize the vibration of automotive engines, and more particularly to a fluid damped elastomeric bushing applicable to, though not limited to, the engine mount of automobiles.

A very useful and compact fluid damped elastomeric bushing is disclosed in U.S. Pat. No. 4,861,004 assigned to the present assignee. The vibration prevention support structure in the U.S. patent has a fluid damped elastomeric sleeve, an elastic member provided between the inner and outer sleeves, a pair of liquid chambers or compartments provided in the central portion of the elastic member with respect to the axial direction of the sleeves, the liquid compartments being arranged along the circumference at specified intervals, and orifices to communicate the liquid compartments with each other. The inner sleeve is eccentric to the outer sleeve in a direction perpendicular to the axis so that when a specified load is applied, the inner sleeve becomes coaxial with the outer sleeve. If necessary, if a load to be applied is rather small, the inner sleeve may be concentric.

A similar fluid damped elastomeric bushing is disclosed in Unexamined Japanese Patent Publication No. 62-224746 (1987), in which an orifice groove is formed on an outer circumferential surface of an outer sleeve so that a fluid can be moved to and from liquid chambers.

However, the conventional fluid damped elastomeric bushing described above has the following problems:

Firstly, relative movement between the inner sleeve and outer sleeve does not always provide a suitable fluid displacement between the two chambers. The side walls of an elastic material must be as thin as possible in view of a dimensional restriction and a spring comstant, etc. and, accordingly, when an inner pressure in the load-receiving liquid chamber is increased due to the load or pressure added thereto, a substantial volume change of the chamber which produces the displacement of a fluid is not provided but only an expansion of the thin wall is induced instead of the fluid displacement.

An attempt was made to efficiently provide a fluid displacement without an expansion of the thin walls as disclosed in Unexamined Japanese Patent Publication No. 1-164831 (1989), in which a rigid plate is provided so as to extend through a main fluid chamber along an inner sleeve with the extended ends being fixed to the side walls, thereby reinforcing the mechanical strength of the thin side walls. However, this attempt has raised a new problem that the rigid plate interrupts smooth displacement of the fluid and, moreover, it sometimes produces a crack in the thin and elastic side walls. Further, the overall structure of the bushing becomes complex by addition of a separate member such as the rigid plate, and the forming mould inevitably becomes complex resulting in less productivity and high cost.

Secondly, in the conventional fluid damped elastomeric bushing, damping (in a low-frequency vibration range) and transmissibility of vibration (in a high-frequency vibration range) only in a vertical direction which is at a right angle relative to an axis of the inner or outer sleeve, that is, in an up and down direction, have been considered. However, consideration of the damping and vibration transmissibility in the vertical direction only is not sufficient and the other two directional damping and vibration transmissibility, that is, damping (in a low-frequency vibration range) and vibration transmissibility (in a high-frequency vibration range) in a lengthwise direction of the inner or outer sleeve and a lateral direction perpendicular to the lengthwise direction, must be taken into consideration. In general, the damping effect conflicts with vibration transmissibility and improvement in damping in a low-frequency range tends to deteriorate the vibration transmissibility in a high-frequency vibration range. Thus, an attempt was made to change an equivalent mass of a vibratory portion of the bushing structure to thereby tune the vibration to a predetermined vibration range is disclosed in Unexamined Japanese Patent Publication No. 2-26337 (1990). However, only vibratory load in a vertical direction was taken into account.

SUMMARY OF THE INVENTION

An object of the present invention is to provide an improvement in a fluid damped elastomeric bushing.

Another object of the present invention is to provide a new fluid damped elastomeric bushing which can provide a desired damping effect and vibration transmissibility in not only the vertical or up-down direction but also in a lengthwise direction of an inner sleeve of the bushing as well as a lateral direction perpendicular to the lengthwise direction on the same plane.

Another object of the present invention is to provide a new fluid damped elastomeric bushing suitable for an engine mount of automobiles, which provides harmonic improvements in damping and vibration transmissibility in a wide range of frequencies.

According to the present invention, there is provided a fluid damped elastomeric bushing comprising:

an inner sleeve and an outer sleeve disposed outwardly of the inner sleeve, two side walls extending between the inner sleeve and the outer sleeve, a partition wall and a diaphragm to thereby form a pair of fluid compartments, the fluid compartments consisting of a main chamber and a supplemental chamber in communication with the main chamber, an elastic support member extending radially outwardly from the inner sleeve toward the outer sleeve between the side walls to thereby form a first main chamber and a second main chamber, and orifice means disposed circumferentially along a part of the outer sleeve for communicating the first and second main chambers for causing a fluid in one of the first and second main chambers to be forcibly fed to the other one of the first and second main chambers when a load is applied to the bushing.

A metal plate can be inserted as an adjustment member into the elastic member in such a manner that the metal plate is fully enclosed in the elastic member or otherwise it can extend between, or slightly beyond, the side walls.

The orifice means may have an arc-shaped member comprising a first hole connected to the first main chamber, a second hole connected to the second main chamber, a groove connecting the first and second holes together and connecting the first and second holes with the supplemental chamber.

According to the present invention, the elastic support member, which is connected between the opposed side walls of the main chamber at each central portion of the side walls, can limit a deformation or expansion of the side walls, the central portion of which tends to be easily deformed or expanded outwardly when a load is applied in a vertical direction. Thus, such a deformation of the side walls can be prevented as much as possible. Further, provision of the elastic support member naturally reduces the inner surface area of the side walls and accordingly deformation of the side walls can be restricted. Consequently, deformation or expansion of the side walls in the present invention can be limited effectively and a liquid in the divided main chambers is forcibly fed to the supplemental chamber through the orifice means to thereby provide a remarkable damping effect when a load is applied to the main chamber. The elastic support member can be formed as a unitary structure with the other parts and elements such as the side walls, etc. to simplify the mold structure for forming the support member to reduce the cost. The elastic support member naturally increases the spring constant in a vertical (up and down) direction and accordingly it will be necessary to cope with the increased spring constant by, for example, selectively lowering the hardness of the rubber material used for the member to a desired spring constant. This can be done easily and will simultaneously lower spring constants in the lateral and lengthwise directions and therefore, vibration transmissibility relative to vibratory loss in the lateral and lengthwise directions can be improved.

In addition, the divided main chambers are communicated with each other and consequently a remarkable damping effect against not only vertical vibration but also lateral vibration can be obtained.

Further, if an adjustment member such as an H-shaped metal plate is provided in the elastic support member, spring constants in the lateral and lengthwise directions can be further lowered, and at the same time vibration transmissibility in these directions can be improved.

BRIEF DESCRIPTION OF THE DRAWINGS

FIGS. 13-17 are graphs showing characteristics of the fluid-damped elastomeric bushing according to the present invention, wherein:

FIG. 13 shows load-defection characteristics;

FIG. 14 shows loss factor-defelection characteristics in a vertical direction;

FIG. 15 shows spring constant-frequency characteristics with and without a metal member as the adjustment member;

FIG. 16 shows spring constant-frequency (Hz) characteristics when the mass of the adjustment member is varied; and FIG. 17 shows loss factor (tan δ)-frequency characteristics with and without fluid communication between the divided first and second main chambers.

PREFERRED EMBODIMENTS OF THE INVENTION

Figure 1:
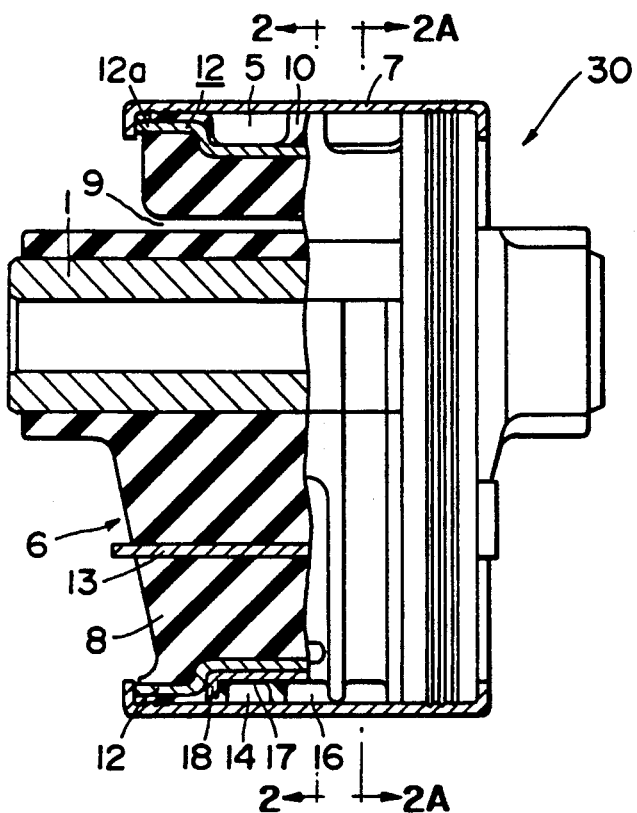
FIG. 1 is a partly sectioned, longitudinal sectional view taken along lines 1—1 of FIG. 3 of fluid-damped elastomeric bushing embodying the present invention.
Figure 2:
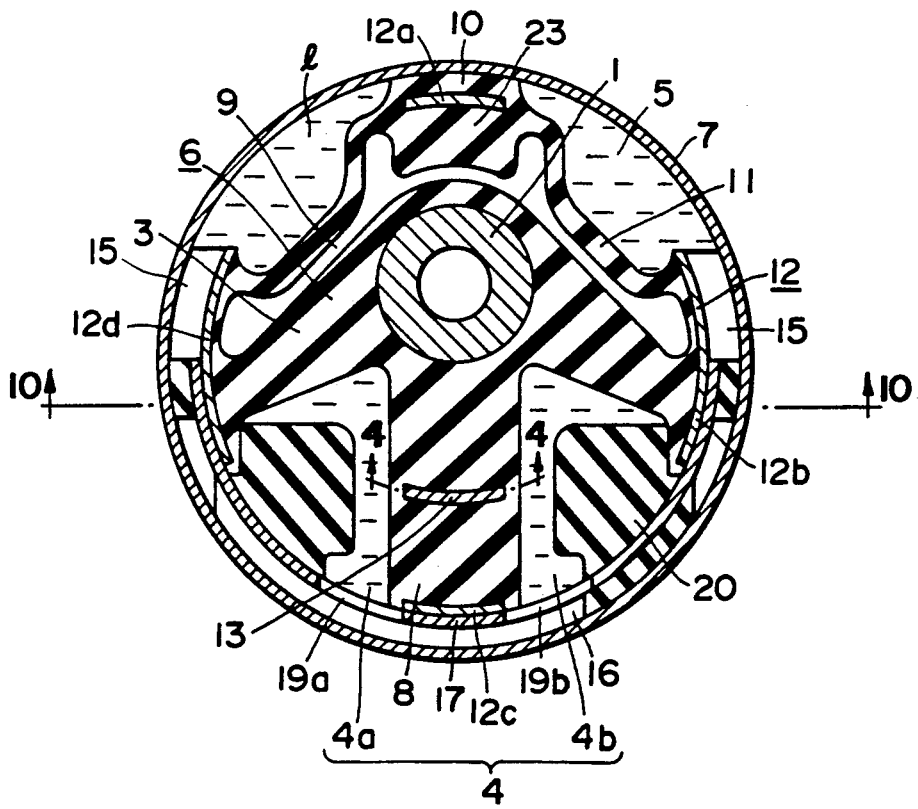
FIG. 2 is a transverse sectional view taken along line 2—2 of the fluid-damped elastomeric bushing shown in FIG. 1.
Figure 3:
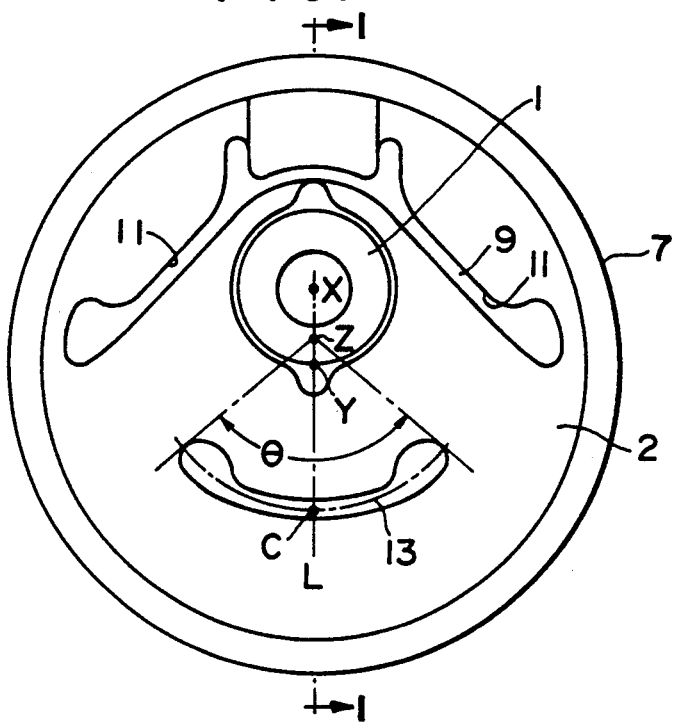
FIG. 3 is a front view of the fluid-damped elastomeric bushing shown in FIG. 1.

Referring to FIGS. 1, 2 and 3, a fluid-damped elastomeric bushing 30 has an inner sleeve 1, an outer sleeve 7 eccentrically positioned around the inner sleeve 1, two side walls 2 extending radially outwardly from the inner sleeve to the outer sleeve 7, partition walls 3 between the walls 2 and extending in an opposite direction radially outwardly from the inner sleeve 1 in a wing-like configuration so that the two side walls 2 and the wing-like partition walls 3 form two spaces, that is, a main or pressure receiving chamber 4 on an eccentrically enlarged side and a supplemental or equilibrium chamber 5 on an eccentrically reduced side with an elastic tube 6 of rubber between the two chambers 4, 5 in an eccentric configuration. Namely, the elastic tube 6 is vertically eccentrically positioned relative to the outer sleeve 7. In the two chambers 4, 5 an incompressible fluid or liquid which is shown by reference character 1 in FIG. 2 is enclosed, and the outer sleeve 7 is mounted circumferentially on the elastic rubber tube 6. An elastic support 8 is provided bridging the inner sleeve 1 and the outer sleeve 7 between the side walls 2. As shown in FIGS. 1 and 2, the elastic support 8 extends radially outwardly from the inner sleeve 1 towards the outer sleeve 7 with a small space formed for securing therein an arc-shaped orifice member which will be described presently. Thus, the elastic support divides the main chamber 4 into two main chamber parts 4a, 4b in a symmetrical structure.

On the side toward the supplemental chamber 5, the partition wall 3 has a hole 9 extending between and along the side walls 2 for providing durability, an extended portion 10 connected to the outer sleeve 7, and two diaphragm portions 11 on both sides of the extended portion 10 for facilitating displacement of the fluid by expanding or moving outwardly toward the main chamber 4. Around the elastic tube 6 is provided tubular reinforcement members 12 with the exception of the area of the main and supplemental chambers 4, 5. Among the several reinforcement member portions 12a, 12b, 12c and 12d the reinforcement member 12a located in a rebound stopper portion 23 of the diaphragm 11 serves to reinforce the diaphragm 11 and increases the stopping effect of the rebound stopper portion 23.

Figure 4:
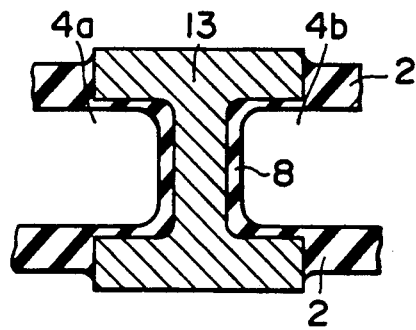
FIG. 4 is a sectional view along line 4—4 of FIG. 2 of a metal plate disposed in an elastic support member in other embodiments of the invention.
Figure 5:
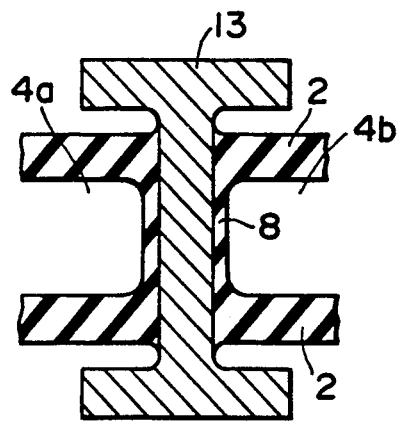
FIG. 5 is a view similar to FIG. 4 of a modified form of the metal plate.

An adjustment plate 13 is substantially completely enclosed in the elastic support 8 as shown in FIGS. 1 and 2. In the embodiment of the invention, the adjustment plate 13 is made of a metal and has an H-shape structure with a slight curvature in compliance with the circular shape of the walls 2. The mass of the adjustment plate 13 can be changed or adjusted by selecting the material and/or shape. In the illustrated embodiment, a substantial portion of the adjustment plate 13 of H-shape is enclosed in the elastic support 8 other than at its extended ends as shown in FIG. 4. However, if necessary, the adjustment plate 13 can be extended well beyond the side walls 2 so that the substantial mass of the adjustment plate 13 is concentrated outside the side walls 2 so that the concentrated mass does not provide an influence on the elasticity of the rubber material of the elastic support 8, as shown in FIG. 5. With reference to FIG. 3, the adjustment plate 13 is formed in an arc shape such that an arc angle $\Theta$ of the adjustment plate 13 is less than 180° and a center Z of the arc shape is on a line L between an axis X of the inner sleeve 1 and an axis Y of the outer sleeve 7, the line L extending through the middle portion C of the adjustment plate 13.

Figure 2A:
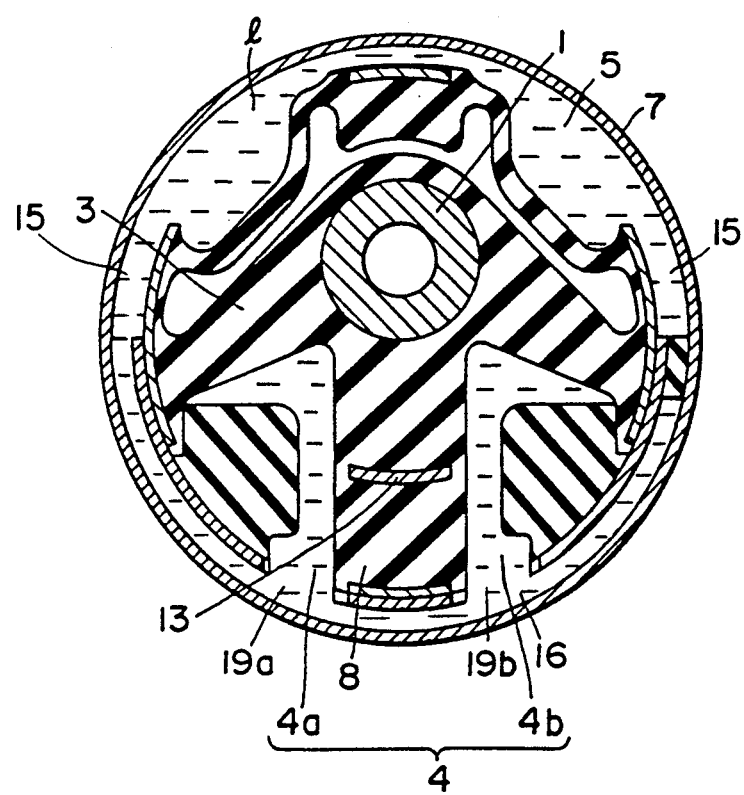
FIG. 2A is a sectional view similar to FIG. 2 taken along line 2-2A of FIG. 2.

The main chamber 4 and the supplemental chamber 5 are connected together by means of an orifice structure 14 so that a liquid can be forcibly fed between the two chambers 4, 5 when a load is applied to the bushing to cause a change in volume of the chambers 4, 5. In the illustrated embodiment, the orifice structure 14 has an orifice groove 15 along the circumference of the elastic tube 6 on the side of the supplemental chamber 5, and an arc-shaped orifice member 17 having an orifice passage 16 on the outer circumference thereof on the side of the main chamber 4 so that the orifice passage 16 is connected to the orifice groove 15 as shown in FIG. 2A. The orifice member 17 is resiliently press-fitted in a recess 18 on the middle portion of the reinforcement member 12 so that the orifice member 17 is accurately and tightly secured in position. This structure provides improvement in rigidity of the rubber elastic tube 6.

Figure 6:
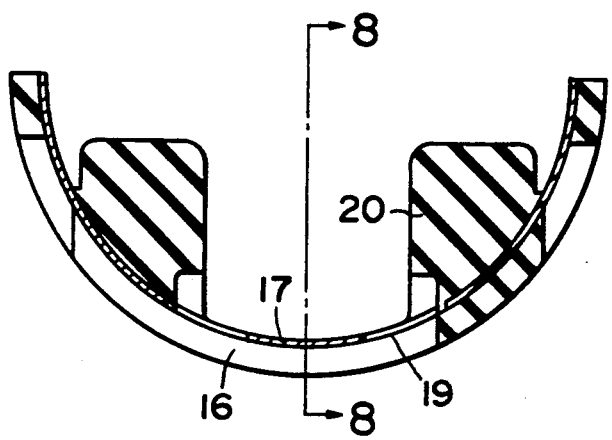
FIG. 6 is a sectional view of an arc-shaped orifice member forming part of the outer sleeve.
Figure 8:
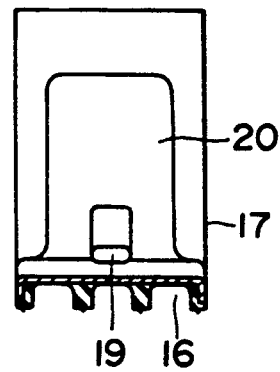
FIG. 8 is a sectional view of the orifice member taken along line 8—8 in FIG. 6.
Figure 7:
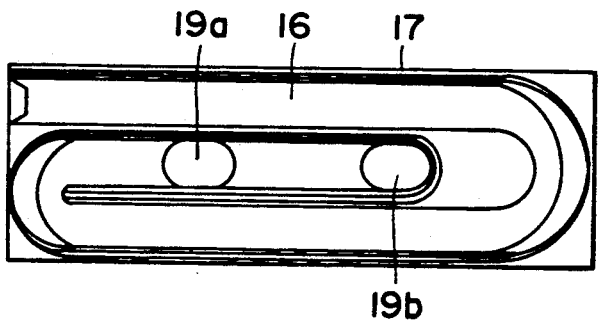
FIG. 7 is a bottom view of the orifice member shown in FIG. 6.

Referring to FIGS. 6, 7 and 8, the orifice passage 16 of the arc-shaped orifice member 17 is formed in a swirl or spiral shape to lengthen the passage to increase the damping property of vibration, and orifice holes 19a, 19b are provided at the position close to the divided main chambers 4a and 4b, respectively, so that a fluid displacement is conducted between the divided main chambers 4a, 4b. This facilitates a remarkable damping of a load in a lateral direction. In this illustrated preferred embodiment, two elastic stoppers 20 are provided to limit a large displacement of the device so that when the device is displaced to a large extent, the stoppers 20 can resiliently abut against the bottom of the elastic partition wall 3 of the wall of the divided main chambers 4a, 4b to provide a soft abutment and limit further displacement. The stoppers 20 are integrally formed with the orifice member 17 so as to facilitate the assembly of the orifice member 17 and the stoppers by simply fitting the orifice member 17 into the recess 18.

Figure 9:
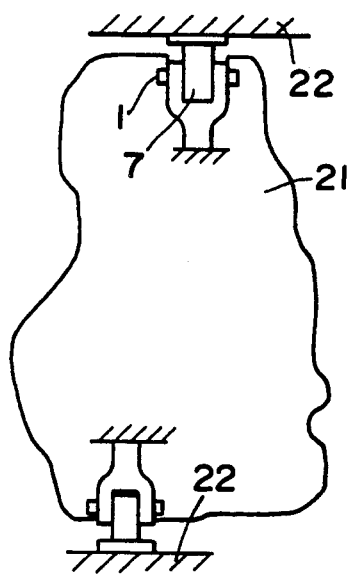
FIG. 9 is a diagram showing the fluid-damped elastomeric bushing used for an engine mount of automobiles.

In FIG. 9, which shows the fluid-damped elastomeric bushing of the invention used as an engine mount for an automobile, the outer sleeve 7 of the bushing is fixed to a frame 22 of an automobile, and an engine 21 is fixed to the inner sleeve 1 in such a manner that the weight of the engine is applied from the eccentrically expanded main chamber side to the inner sleeve 1 so that the eccentrically expanded main chamber 4 will be reduced in volume. Thus, vibration generated by the engine 21 can be limited and reduced.

Figure 10:
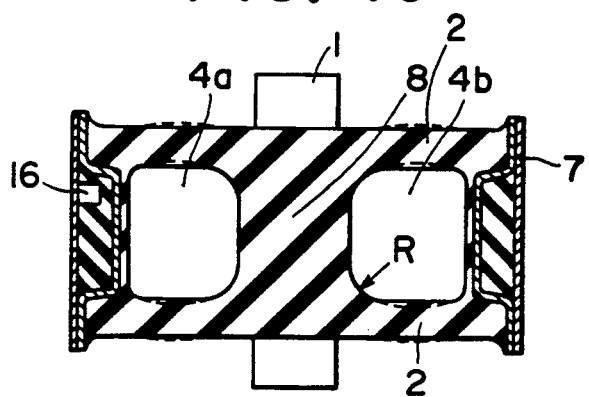
FIG. 10 is a sectional view of the bushing having an elastic support member according to the present invention, diagramatically showing less deformation of the side walls.
Figure 11:
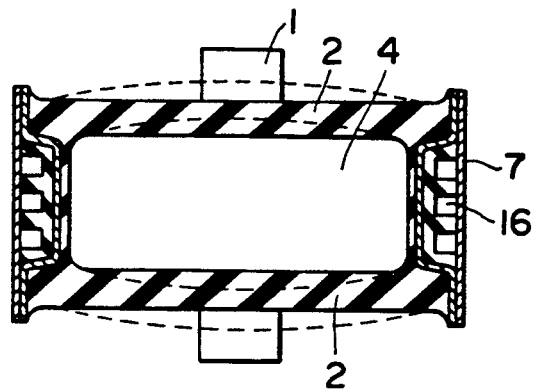
FIG. 11 is, similar to FIG. 10, a sectional view of a conventional bushing, diagrammatically showing a greater expansion or deformation of the side walls.
Figure 12:
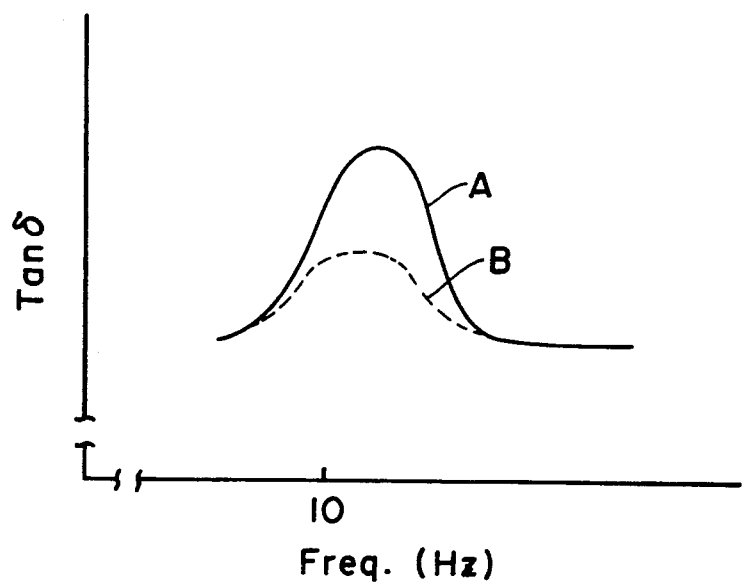
FIG. 12 is a graph showing a loss factor (tan δ)-frequency (Hz) characteristic with and without the elastic support member shown in FIGS. 1, 2 and 10 according to the present invention.

According to the present invention, the elastic support 8 can restrict deformation of the side walls when a vertical load is applied as shown in FIG. 10 and in this case the liquid displacement is increased between the main chamber 4 and the supplemental chamber 5. In contrast, the conventional structure shown in FIG. 11 merely causes expansion of the side walls 2 with less liquid displacement between the main and supplemental chambers 4 and 5. Clearly, a sufficient displacement of liquid can fully consume the vibration energy, with the result of a substantial increase in damping of vibration. In other words, the loss factor (tan $\delta$) is improved by providing the elastic support 8 as shown in FIG. 12. The graph of FIG. 12 shows a case where an R value at the corner confined by the elastic support 8 and the side walls 2 is 2R, and which can be increased to 5R, 10R, etc., to achieve a further improvement in the loss factor.

Figure 17:
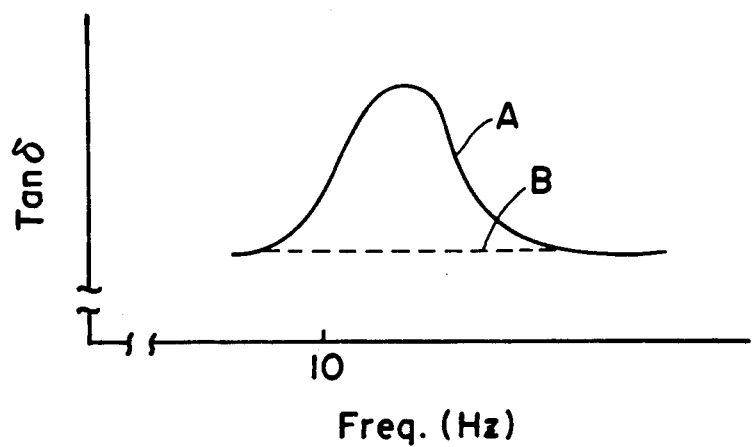

The divided main chambers 4a, 4b are communicated by a suitable orifice device and, accordingly, a liquid displacement also in a lateral direction can be conducted so that a damping similiar to the damping in the vertical direction can be obtained and consequently a vibration in the case of an idling engine can be reduced by tuning, as shown in FIG. 17. In FIG. 17 the solid line A indicates improvement in the loss factor when the divided main chambers 4a, 4b are communicated with each other as described above, and the dotted line B indicates the loss factor in the case where the divided main chambers are not communicated. As shown in FIG. 17, a remarkable damping is obtained in a low-frequency vibration range.

In the preferred embodiment, the metal plate 13 serving as the adjustment means is disposed in the elastic support 8. In this case, a suitable elastic modulus of the elastic support 8 is determined in accordance with the metal plate 13 so that rigidities in each of the vertical, lateral and lengthwise directions can be changed, and the rigidities in both lateral and lengthwise directions can be lowered without lowering the ridigity in the vertical direction. Accordingly, vibration transmissibilities in the three directions are simultaneously satisfied without any sacrifice of durability. Further, a resonance point can be shifted by a change of elastic modulus. An example of an elastic modulus (i.e., spring constants in lateral and lengthwise directions/spring constant in a vertical direction) with or without the metal plate 13 as the adjustment means is shown below:

|  | spring constant | | |
|---|---|---|---|
|  | vertical direction | lateral direction | lengthwise direction |
| with adjustment means | 1 | 0.53 | 0.22 |
| without adjustmentmeans | 1 | 0.80 | 0.31 |

It will be understood from the above table that the adjustment means 13 can lower the rigidities in the lateral and lengthwise directions, which means that the vibration transmissibility in these directions can be improved.

Figure 13:
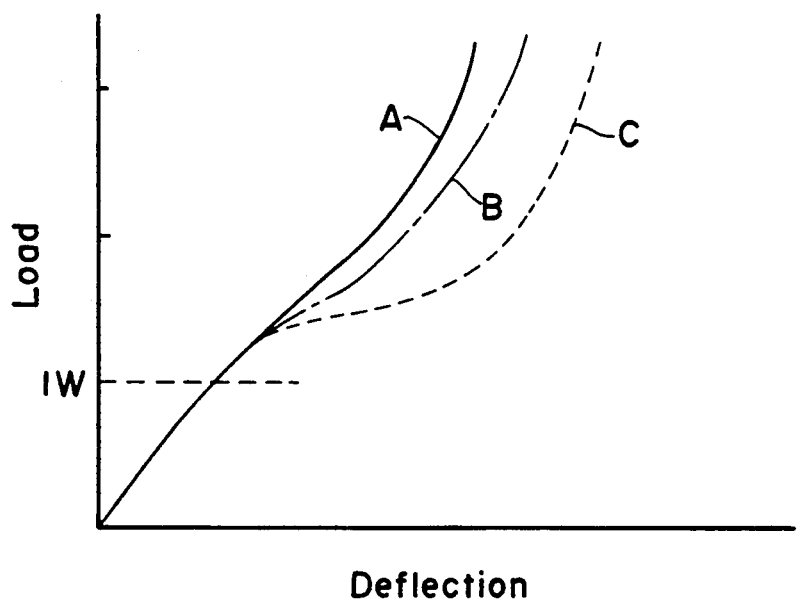

Further, it is found that the adjustment means (metal plate 13) can also improve a static property when a spring constant is tuned to around 1W in the vertical direction (i.e. engine sharing weight) as shown in FIG. 13, in which the solid line A shows a deflection curve when both the elastic support 8 and the metal plate 13 as the adjustment means are provided, the chain line B shows the case where the elastic support 8 is not provided with adjustment means, and the dotted line shows the case where no elastic support 8 is provided. As shown in FIG. 13, provision of both the elastic support 8 and the metal plate 13 as the adjustment means can reduce deflection in a vertical direction relative to the weight, and this can improve the durability and reduce fatigue of the elastic material of the bushing.

Figure 14:
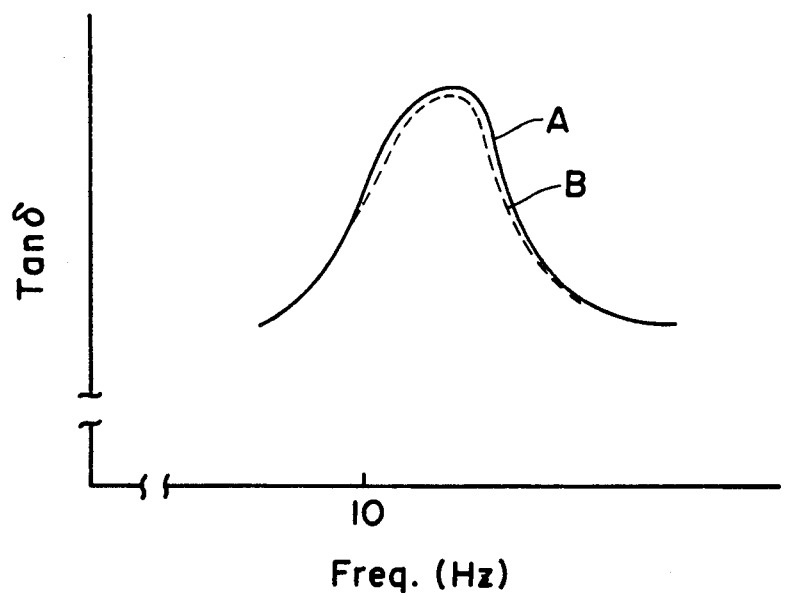
Figure 15:
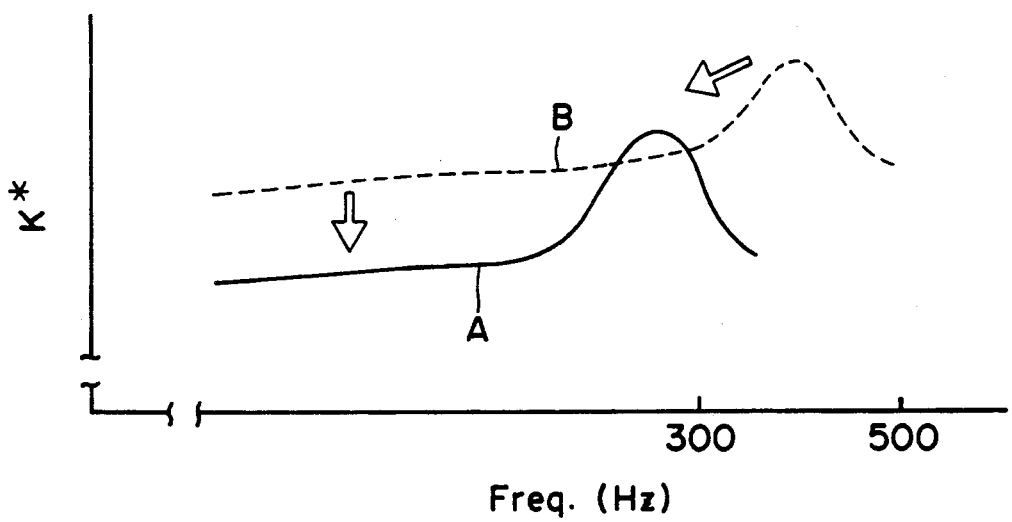

Although the damping in the vertical direction is substantially unchanged or changed very slightly in a low-frequency vibration range by providing the adjustment means such as the metal plate 13 as shown in FIG. 14 in which the solid line shows the loss factor curve when the adjustment means is provided and the dotted line shows a similar curve when no adjustment means is provided, the adjustment means can lower the absolute value of the complex spring constant (K*), that is, vibration transmissibility, in the lengthwise direction in low and middle-frequency ranges and a resonance point generated in the frequency range of 300-500 Hz can be shifted to a lower frequency range which is outside the 300-500 Hz range, as illustrated in FIG. 15. In FIG. 15, the solid line A indicates an absolute value of the complex spring constant K* in a lengthwise direction of the inner sleeve 1 when the adjustment means is provided, and the dotted line B indicates an absolute value of the complex spring constant K* in the same direction as above when the adjustment means is not provided.

Figure 16:
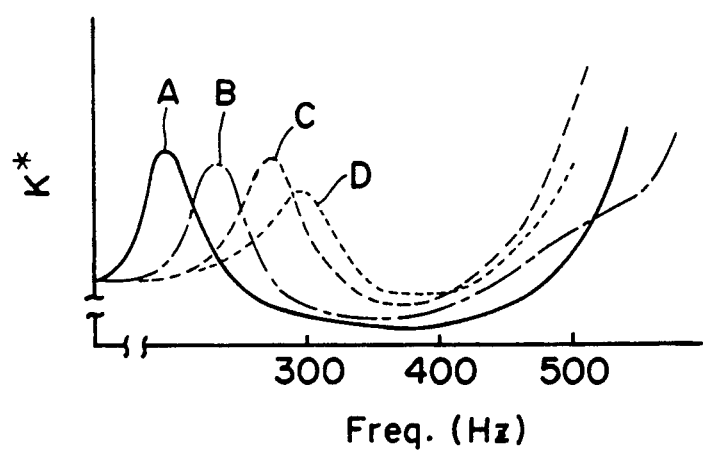

According to the present invention, the vibratory system of the elastic support 8 can be tuned in accordance with various properties of the engine and other related members to shift the resonance point to a desired frequency range and cancel a problematic or undesired resonance point. FIG. 16 shows an example of changing the mass or weight of the metal plate 13 as the adjustment means enclosed in the elastic support 8 so as to obtain a shift of the peak or resonance point. As shown, an increase in the weight of the adjustment means (metal plate 13) shifts the peak toward a low-frequency range. By utilizing this phenomenon, vibration transmissibility in all three directions or any selected direction can be improved.

What is claimed is:

1. A fluid damped elastomeric bushing comprising:
   an inner sleeve and an outer sleeve disposed outwardly of said inner sleeve;
   two sidewalls extending between said inner sleeve and said outer sleeve, and a partition wall extending between said sidewalls and outwardly from said inner sleeve and a diaphragm extending between said sidewalls and spaced diametrically from said partition wall to thereby form a pair of fluid compartments, said fluid compartments consisting of a pressure receiving chamber and an equilibrium chamber in communication with said pressure receiving chamber,
   an elastic support member in said pressure receiving chamber extending radially outwardly from said inner sleeve toward said outer sleeve between said sidewalls to thereby form a first pressure receiving chamber part and a second pressure receiving part, and
   orifice means disposed circumferentially along a part of said outer sleeve for communicating the first pressure receiving chamber part with said second pressure receiving chamber part for causing fluid in one or the other of said first and second pressure receiving chamber parts to be forcibly fed to the other one of the first and second pressure receiving chamber parts when a load is applied to the bushing.

2. A fluid-damped elastomeric bushing according to claim 1, wherein said elastic support member has therein an adjustment means.

3. A fluid-damped elastomeric bushing according to claim 2, wherein said adjustment means has a metal plate substantially enclosed in said elastic support member.

4. A fluid-damped elastomeric bushing according to claim 1, wherein said orifice means comprises an arc-shaped member having a first hole connected to said first pressure receiving chamber part, a second hole connected to said second pressure receiving chamber part, a groove connecting the first and second holes together and connecting the first and second holes with said equilibrium chamber.

5. A fluid-damped elastomeric bushing according to claim 1, wherein said diaphragm and said outer sleeve define said equilibrium chamber therebetween.

* * * * *